United States Patent [19]

Bemiss

[11] 4,325,283
[45] Apr. 20, 1982

[54] ARMORED GRILLE

[75] Inventor: James M. Bemiss, St. Clair Shores, Mich.

[73] Assignee: Cadillac Gage Company, Warren, Mich.

[21] Appl. No.: 131,585

[22] Filed: Mar. 19, 1980

[51] Int. Cl.³ .............................................. F41H 5/00
[52] U.S. Cl. .................................... 89/36 F; 89/36 A;
89/36 R; 89/36 H; 296/188
[58] Field of Search .................... 89/36 A, 36 R, 36 F,
89/36 G, 36 H; 109/49.5; 180/90.6; 296/187,
188, 35.2

[56] References Cited

U.S. PATENT DOCUMENTS 1,069,154  8/1913  Maedje ............................... 89/36 H
2,376,331  5/1945  Abrams .............................. 89/36 H
3,428,141  2/1969  Forstner ............................. 89/36 H

FOREIGN PATENT DOCUMENTS 1157592  7/1969  United Kingdom ............... 89/36 H Primary Examiner—Donald P. Walsh
Attorney, Agent, or Firm—Reising, Ethington, Barnard, Perry & Brooks

[57] ABSTRACT

A vehicle body armored grille (20) disclosed has particular utility with a front engine compartment opening (24) and includes vertically spaced louvers (26) of an improved armor plate construction for stopping projectiles from passing through the grille. Each louver (26) has an elongated shape extending horizontally across the opening and includes an outer armor plate (30) that is inclined downwardly in an outward direction and an inner armor plate (32) secured to and extending downwardly from the upper and inward extremity of the outer armor plate. An upper extremity (34) of each inner armor plate (32) projects above the associated outer armor plate (30) to deflect a projectile impacted therewith upwardly toward the next higher louver. Orienting the outer armor plate at an inclination of 45° with respect to the horizontal and the inner armor plate at a greater angle, i.e. 55°, defines an acute junction therebetween at which the plates are welded to each other and at which a projectile deflected upwardly from the next lower louver is trapped. Opposite ends of each louver (26) are welded to side plates (36) on a peripheral plate-like support (28) that mounts the grille on the associated vehicle body.

9 Claims, 5 Drawing Figures

ARMORED GRILLE

TECHNICAL FIELD

This invention relates to an armored grille for use with a vehicle and has particular utility for use with a front engine compartment opening where the engine radiator is located.

BACKGROUND ART

Armored grilles for vehicles conventionally provide ventilation cooling of the vehicle engine compartment while preventing projectiles such as bullets or shrapnel from passing through the grille into the vehicle. One type of armored grille is disclosed by U.S. Pat. Nos. 2,363,573 and 3,068,757 and includes louvers that are bent from an armor plate which defines an outer surface of the vehicle body. Such louvers define openings that face away from the direction from which projectiles are most likely to come. Normally, the openings defined by these louvers must be of a relatively small size in order to prevent stray or deflected projectiles from passing through the openings between the louvers upon striking the grille from the direction toward which the louvers open.

Another type of armored grille disclosed by U.S. Pat. Nos. 2,376,331, 2,397,809, and 3,901,124 includes louvers with cross-sections of curved shapes for preventing projectiles from passing along a straight trajectory through the grille. Such louvers must either be deformed or machined by a suitable operation or must be cast or extruded with the curved cross-section and, as such, the consequent cost adds to to the total cost of the vehicle.

Another type of armored grille disclosed by U.S. Pat. No. 3,504,644 includes spaced sets of louvers that cooperate to prevent any projectile moving along a straight trajectory from passing through the grille. Manufacturing such a grille requires both time and a consequent expense in providing a structure that secures and positions the spaced louvers of each set in the proper location with respect to each other.

Other air vents, and the like are disclosed by U.S. Pat. Nos. 1,374,770; 1,440,307; 1,539,509; 1,736,621; 1,899,735; 1,911,408; 1,928,013; 2,393,350; and 3,749,028.

DISCLOSURE OF INVENTION

An object of the present invention is to provide a vehicle armored grille of an improved construction that is economical to manufacture as well as effective in use to stop projectiles while still permitting efficient airflow through the grille. Although the improved construction of the armored grille is usable with various vehicle body openings, the front engine compartment opening adjacent the engine radiator is one use for which the armored grille has particular utility in preventing projectiles from passing through the grille and striking the radiator while still permitting good airflow to provide cooling of the radiator.

In carrying out the above object and other objects of the invention, the armored grille includes a plurality of vertically spaced louvers of elongated shapes extending horizontally across the vehicle body opening with which the grille is used. Each louver includes an outer armor plate that is inclined downwardly in an outward direction with respect to the opening. An inner armor plate of each louver is secured to and extends downwardly from the upper and inward extremity of the associated outer armor plate. An upper extremity of each inner armor plate projects above the associated outer armor plate to deflect a projectile impacted therewith upwardly toward the next higher louver so as to thereby prevent passage of projectiles through the grille.

In the preferred construction disclosed, the louvers include welds that secure the upper and inward extremity of each outer armor plate to the associated inner armor plate. These welds are most preferably located at a lower junction between the inner and outer armor plates of the louvers. Opposite ends of each louver are also secured by welds to a pair of vertically extending side plates respectively supported adjacent opposite side of the vehicle body opening.

Best results in stopping projectiles are achieved with the inner armor plate of each louver inclined so as to extend downwardly in an inward direction with respect to the opening. The outer armor plate preferably is inclined at approximately 45° with respect to horizontal while the inner armor plate is inclined at more than 45° with respect to the horizontal, 55° as disclosed, such that the armor plates of each louver define an acute junction for trapping a projectile deflected upwardly thereat by the next lower louver.

A peripheral plate-like support of the grille has approximately the same shape as the vehicle engine compartment opening with which the grille has particular utility in stopping projectiles while permitting airflow therethrough to the adjacent engine radiator. Fasteners secure the plate-like support to the exterior of the vehicle body about the engine compartment opening. At each side of the opening, the side plates to which the louver ends are welded project inwardly through the opening. Also, a vertical strip of the support extends between upper and lower extremities thereof and is secured by welds to the lower and outward extremity of each outer armor plate to provide support thereof upon being impacted by a projectile.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
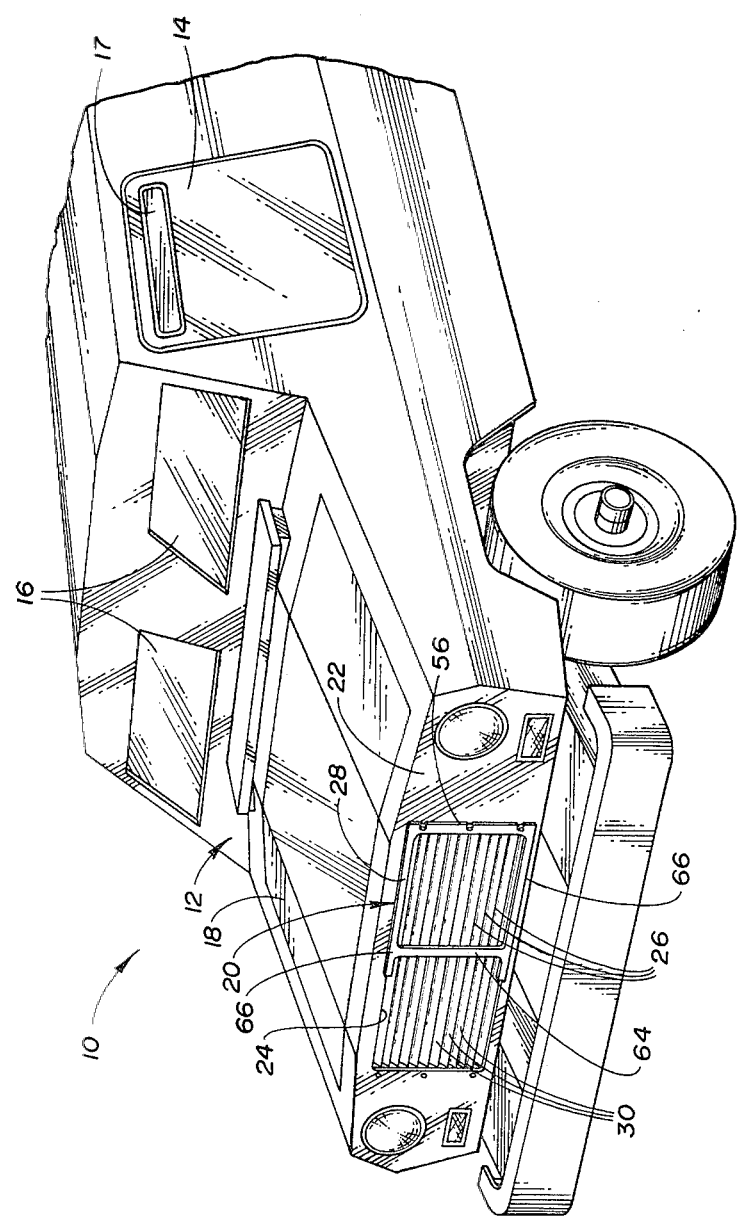
FIG. 1 is a partial perspective view of a vehicle including an armored grille that is constructed in accordance with the present invention and shown partially broken away for illustrative purposes.

Referring to FIG. 1 of the drawings, an armored vehicle generally indicated by 10 includes a body 12 that is constructed from metal armor plate of a suitable thickness and composition so as to be capable of stopping projectiles such as bullets and shrapnel. The passenger compartment of the vehicle 10 is accessible through side doors 14 (only one shown) as well as through an unshown rear door. A vehicle passenger can observe the surrounding terrain through bulletproof front windshields 16 as well as through a bulletproof window 17 of the side door 14. The front engine compartment of the vehicle is accessible by moving a hood 18 from the closed position shown to an open position in order to permit maintenance or repair.

An armored grille of the vehicle is constructed in accordance with the present invention and indicated generally by 20 in FIG. 1. A front armor plate 22 of the vehicle body defines an opening 24 to the engine compartment under the hood 18 and mounts the grille 20 so as to cover the engine compartment opening. Armored grille 20 of the vehicle prevents projectiles such as bullets or shrapnel from passing through the opening 24 into the engine compartment while still permitting airflow therethrough in order to provide ventilation for cooling the engine radiator as well as preventing the air temperature within the engine compartment from becoming excessively high.

Armored grille 20 illustrated in FIG. 1 includes a plurality of vertically spaced louvers 26 which have elongated shapes and are mounted by a peripheral support 28 extending horizontally across the opening so as to stop projectiles directed at the grille while permitting airflow therethrough into the engine compartment. Each louver 26, as seen by additional reference to FIGS. 4 and 5, includes an outer armor plate 30 which is inclined downwardly in an outwardly extending direction with respect to the engine compartment opening. An inner armor plate 32 of each louver 26 is secured to and extends downwardly from the upper and inward extremity of the associated outer armor plate 30. An upper extremity 34 of each inner armor plate 32 projects above the associated outer armor plate 30 in order to deflect a projectile impacted therewith upwardly toward the next higher louver 26 so as to thereby prevent passage of projectiles through the grille.

Figure 3:
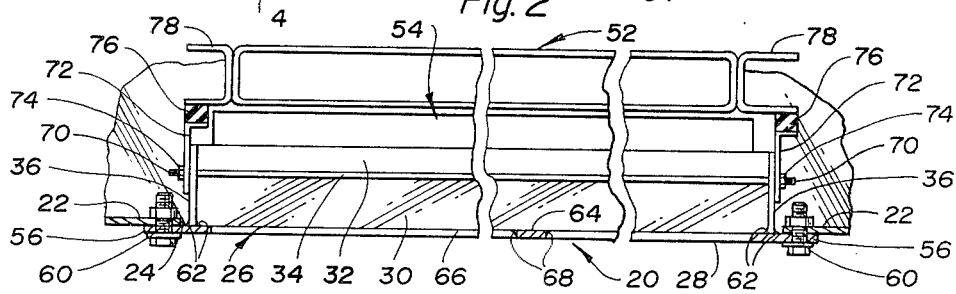
FIG. 3 is a top plan view of the grille taken partially in section along line 3—3 of FIG. 2.
Figure 4:
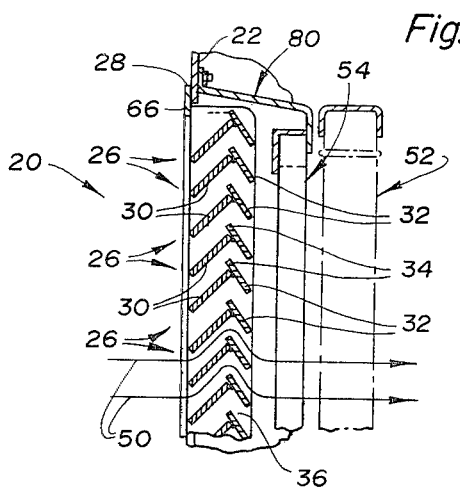
FIG. 4 is an elevation view taken in section through the grille along line 4—4 of FIG. 2.
Figure 5:
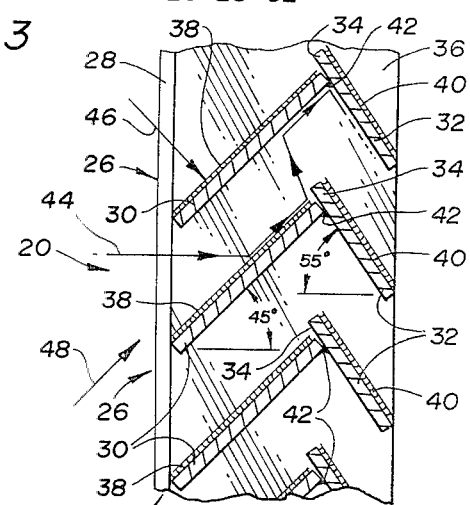
FIG. 5 is an enlarged view of a portion of FIG. 4 and illustrates the manner in which projectiles are stopped by the grille.

As seen in FIGS. 3, 4 and 5, each louver 26 extends between a pair of vertically extending side plates 36 which are mounted on the grille support 28. Continuous welds 38 and 40 (FIG. 5) respectively secure the ends of the outer and inner armor plates 30 and 32 to the side plates 36, while continuous welds 42 secure the outer and inner armor plates of each louver 26 to each other at a lower junction between the plates.

As seen in FIG. 5, each outer armor plate 30 is inclined at approximately 45° with respect to the horizontal while each inner armor plate 32 is inclined at more than 45° with respect to the horizontal, 55° as shown, in order to define an acute angle between the inner and outer armor plates. A projectile which is directed at the grille 20 in a horizontal direction, as shown by the arrow path 44, initially is deflected by the outer armor plate 30 in an upward and inward direction along the top inclined surface thereof toward the upper extremity 34 of the inner armor plate 32. Upon impacting with the upper extremity 34 of the inner armor plate, the projectile is deflected upwardly and outwardly toward the next higher louver 26 and is deflected by the bottom inclined surface of the outer armor plate 30 thereof toward the acute junction between the inner and outer armor plates. Most of the energy is dissipated from the projectile by the time it reaches the acute junction between the inner and outer armor plates where the continuous weld 42 therebetween is located and the remaining mass of the projectile then merely falls under the bias of gravity without penetrating the grille in a manner that could cause any damage to the vehicle engine compartment components located to the rear of the grille.

Projectiles directed in a downward direction, as shown by arrow path 46 in FIG. 5, are likewise prevented from passing through grill 20 since two of the outer armor plates 30 are normally positioned along such a path and have a combined strength sufficient to prevent any penetration of the projectile. Also, any upwardly directed projectiles, such as a deflected bullet or shrapnel directed along arrow path 48 in FIG. 5, will not normally have sufficient energy to penetrate the inner armor plate 32 against which such a projectile would impact. Despite its ability to stop projectiles, the grille 28 still allows airflow therethrough as shown by arrows 50 in FIG. 4 so as to provide cooling of the engine radiator 52 and air conditioning condensor core 54.

Figure 2:
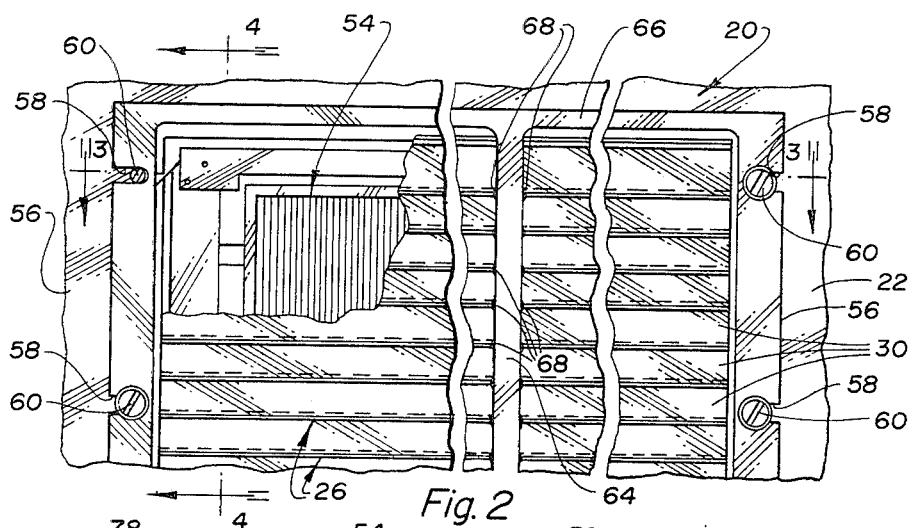
FIG. 2 is a front elevation view of the armored grille shown partially broken away.

With combined references to FIGS. 1, 2, and 3, the support 28 of grille 20 has a peripheral plate-like construction with approximately the same shape as the engine compartment opening 24 but of a slightly larger size so as to engage front armor plate 22 of the vehicle body at the periphery of the opening in the mounted relationship shown. At its side extremities 56, support 28 includes openings 58 (FIG. 2) through which suitable fasteners 60 extend while also extending through aligned openings in the vehicle body plate 22 in order to secure the grille in position. Each of the side plates 36, as seen in FIG. 3, is secured by continuous welds 62 to the inner surface of the adjacent side extremity 56 on the support 28 such that the side plates project inwardly through the engine compartment opening 24 at its opposite sides.

Between the lateral extremities of the grille 20 as seen in FIG. 1, the support 28 includes a central vertical strip 64 extending between the upper and lower extremities 66 of the support. Each louver 26 is secured to the support strip 64 as shown in FIG. 2 by a pair of welds 68 at the lower and outward extremity of the outer armor plate 30 of the louver. Support strip 64 thus reinforces the louvers 26 between their opposite lateral ends in order to provide strength thereto upon being impacted by a projectile in the manner previously described.

As seen in FIG. 3, the side plates 36 have threaded studs 70 on which associated side air deflectors 72 are mounted and secured by nuts 74. Rubber seals 76 on inner flanges of the side air deflectors 72 engage side brackets 78 that support the radiator 52 such that the seals prevent air that passes through the grille from leaking around the radiator. Longitudinal slots in the deflectors 72 are preferably provided to receive the studs 70 and thereby permit fore and aft adjustment of the deflectors so as to achieve proper compression of the seals 76. Also, similar upper and lower air deflectors can likewise be provided on the upper and lower sides of the grille such as shown by the upper deflector 80 illustrated in FIG. 4 as mounted on the rear side of the front plate 22. This upper deflector 80 can be made from sheet rubber or another flexible material whose rear edge portion merely rests on the air conditioner condensor core 54 and can also be made from sheet metal like the side deflectors 72.

Each of the armor plate components of the armored grille 20 is flame cut from suitable armor plate stock prior to welding of the plates to each other to provide an effective and economical grille.

While the best mode for practicing the present invention has herein been described in detail, those familiar with the art to which this invention relates will recognize various alternative designs and embodiments for practicing the invention as defined by the following claims.

I claim:

1. An armored grille for a vehicle body opening comprising: a plurality of vertically spaced louvers having elongated shapes extending horizontally across the opening; each louver including an outer armor plate that is inclined downwardly in an outward direction with respect to the opening; each louver also including an inner armor plate that is engaged with and secured to the upper and inward extremity of the associated outer armor plate; and each inner armor plate extending downwardly from the associated outer armor plate and having an upper extremity that projects above the associated outer armor plate to deflect a projectile impacted therewith upwardly toward the engaged outer and inner armor plates of the next higher louver so as to thereby prevent passage of projectiles through the grille.

2. An armored grille as in claim 1 wherein the louvers further include welds that secure the upper and inward extremity of each outer armor plate to the associated inner armor plate.

3. An armored grille as in claim 2 wherein the inner and outer armor plates of each louver have a lower junction at which the weld therebetween is located.

4. An armored grille as in claim 1, 2 or 3 wherein the inner armor plate of each louver is inclined extending downwardly in an inward direction with respect to the opening.

5. An armored grille as in claim 4 wherein the outer armor plate of each louver is inclined at approximately 45° with respect to the horizontal and wherein the inner armor plate of each louver is inclined at more than 45° with respect to the horizontal such that the armor plates of each louver define an acute junction in order to trap projectiles directed at the grille.

6. An armored grille for the front engine compartment opening of a vehicle body, the grille comprising: a pair of vertically extending side plates respectively supported adjacent opposite sides of the opening; a plurality of vertically spaced louvers having elongated shapes extending horizontally between the side plates so as to be disposed across the opening; each louver including an outer armor plate that is inclined downwardly in an outward direction with respect to the opening; each louver also including an inner armor plate engaged with and extending downwardly and inwardly in an inclined orientation from the upper and inward extremity of the associated outer armor plate; each inner armor plate having an upper extremity that projects above the associated outer armor plate to deflect a projectile impacted therewith upwardly toward the engaged outer and inner armor plates of the next higher louver so as to thereby prevent passage of projectiles through the grille; and welds that secure the armor plates of each louver to both side plates and to each other in order to carry the resultant forces when a projectile is impaced with the grille.

7. An armored grille for the front engine compartment opening of a vehicle body, the grille comprising: a support of a plate-like construction for mounting the grille on the vehicle body extending across the front engine compartment opening thereof; a pair of vertically extending side plates mounted on the support projecting inwardly adjacent opposite sides of the opening; a plurality of vertically spaced louvers having elongated shapes extending horizontally between the side plates so as to be disposed across the opening; each louver including an outer armor plate that is inclined at approximately 45° with respect to the horizontal extending downwardly in an outward direction with respect to the opening; each louver also including an inner armor plate engaged with and extending downwardly and inwardly from the upper and inward extremity of the associated outer armor plate in an inclined orientation of more than 45° with respect to the horizontal so as to define an acute junction with the outer armor plate; each inner armor plate having an upper extremity that projects above the associated outer armor plate to deflect a projectile impacted therewith upwardly toward the acute junction between the engaged outer and inner armor plates of the next higher louver so as to thereby prevent passage of projectiles through the grille; and welds that secure the armor plates of each louver to both side plates and to each other in order to carry the resultant forces when a projectile is impaced with the grille.

8. An armored grille for the front engine compartment opening of a vehicle body, the grille comprising: a peripheral plate-like support with approximately the same shape as the engine compartment opening but of a slightly larger size; connectors for securing the support to the exterior of the vehicle body about the engine compartment opening; a pair of vertically extending side plates mounted on the support projecting inwardly through the opening respectively adjacent opposite sides thereof; a plurality of vertically spaced louvers having elongated shapes extending horizontally between the side plates so as to be disposed across the opening; each louver including an outer armor plate that is inclined at approximately 45° with respect to the horizontal extending downwardly in an outward direction with respect to the opening; each louver also including an inner armor plate engaged with and extending downwardly and inwardly from the upper and inward extremity of the associated outer armor plate in an inclined orientation of approximately 55° with respect to the horizontal so as to define an acute junction with the outer armor plate; each inner armor plate having an upper extremity that projects above the associated outer armor plate to deflect a projectile upwardly toward the engaged outer and inner armor plates of the next higher louver and to thereby prevent passage of projectiles through the grille; and welds that secure the armor plates of each louver to both side plates and to each other at the acute junction therebetween in order to carry the resultant forces when a projectile is impaced with the grille.

9. A grille as in claim 7 or 8 wherein the support includes a vertical strip secured to the lower and outward extremity of each outer armor plate to provide support thereof upon being impacted by a projectile.

* * * * *

UNITED STATES PATENT AND TRADEMARK OFFICE
CERTIFICATE OF CORRECTION

PATENT NO. : 4,325,283
DATED : April 20, 1982
INVENTOR(S) : James M. Bemiss

It is certified that error appears in the above—identified patent and that said Letters Patent is hereby corrected as shown below:

Column 6, line 2, "impaced" should be -- impacted --.
Column 6, line 30, "impaced" should be --impacted --.

Signed and Sealed this

Nineteenth Day of October 1982

[SEAL]

Attest:

Attesting Officer

GERALD J. MOSSINGHOFF
Commissioner of Patents and Trademarks